United States Patent [19]

Muratani et al.

[11] 4,272,846
[45] Jun. 9, 1981

[54] METHOD FOR CANCELLING IMPULSIVE NOISE

[75] Inventors: Takuro Muratani, Tokyo; Tatsuo Watanabe, Mitaka; Michihisa Ohkawa; Takeshi Mizuike, both of Tokyo, all of Japan

[73] Assignee: Kokusai Denshin Denwa Kabushiki Kaisha, Tokyo, Japan

[21] Appl. No.: 4,989

[22] Filed: Jan. 19, 1979

[30] Foreign Application Priority Data

Feb. 1, 1978 [JP] Japan .................................. 53-9230

[51] Int. Cl.³ ............................................... H04B 1/10
[52] U.S. Cl. ....................................... 455/296; 455/63;
455/304; 455/305; 179/1 P
[58] Field of Search ........................ 325/472, 473–477,
325/480, 324, 65, 42; 179/1 P; 455/295, 296,
303, 304, 305, 306, 307, 312, 75, 63

[56] References Cited

U.S. PATENT DOCUMENTS

| | | | |
|---|---|---|---|
| 3,132,339 | 5/1964 | Boughnou | 325/473 |
| 3,611,145 | 10/1971 | O'Connor | 325/477 |
| 3,739,285 | 6/1973 | Hepp | 325/473 |
| 4,081,837 | 3/1978 | Tada et al. | 325/477 |
| 4,130,805 | 12/1978 | Mori et al. | 325/65 |

*Primary Examiner*—Benedict V. Safourek
*Assistant Examiner*—Tommy P. Chin
*Attorney, Agent, or Firm*—Robert E. Burns; Emmanuel J. Lobato; Bruce L. Adams

[57] ABSTRACT

A method for cancelling impulsive noise in a system of transmitting a band-limited baseband signal through a channel with a wider band than that of the baseband signal, in which an impulsive noise caused in the transmission channel is detected, to produce a detected output, from the received signal of the transmission channel outside of the frequency band of the band-limited baseband signal, and in which a cancelling pulse of reverse-polarity is produced as a pseudo noise pulse from the detected impulsive noise output and then superimposed on the original received signal, thereby cancelling the impulsive noise.

3 Claims, 7 Drawing Figures

(a) (b) (c)

METHOD FOR CANCELLING IMPULSIVE NOISE

BACKGROUND OF THE INVENTION

1. Field of the Invention

This invention relates to method for cancelling an impulsive noise in a system of transmitting a band-limited baseband signal through a channel with a wider band than that of the baseband signal.

2. Description of the Prior Art

In the transmission using a channel, it is of prime importance that transmitted information is faithfully regenerated in the receiving station. In practice, however, transmitted signals are disturbed by transmission distortion and noise in the channel; therefore the transmitted information is not always regenerated completely in the receiving station. To avoid this, there have been proposed a variety of transmission systems in which signals are not easily affected by such disturbance under the condition of a limited transmitting power. For example, in a microwave circuit, an SSB-FM system has been widely employed, and recently a digital communication system such as a PCM system has also come into use.

However, these conventional systems have a defect such that when a ratio C/N (the carrier power vs. noise power ratio) is smaller than a certain value, the signal quality is rapidly degraded by an impulsive noise. That is, when a ratio C/N is reduced to increase the noise amplitude, the signal is phase-modulated by the noise. If the noise amplitude exceeds the signal amplitude, a resultant vector phase varies within a phase range of 0 to $2\pi$ because their phases change independently of each other. In this case, since it is an angular frequency that the phase is differentiated by time, the differentiated value of the resultant vector phase varies in the vicinity of the signal angular frequency. In a case where the phase of the received signal has been inverted by the noise, it changes from $-\pi$ to $\pi$ or vice versa. At this time, a jump of the phase occurs, so that the angular frequency becomes infinite to produce a large spike in the output from an FM detector which is employed for detecting a frequency deviation. For the SSB-FM system, a high sensitivity demodulation system which equivalently reduces the transmission band to increase a ratio C/N, such, for example, as a frequency negative feedback system (FMFB), a phase synchronization negative feedback system (PLL) or the like, offers an effective solution to the abovesaid problem. Further, for the digital communication system, there are various error correcting systems which provide redundancy in transmitted information.

However, these conventional methods introduce complexity in the circuit construction, and in the case of the latter, the amount of information being transmitted is inevitably reduced.

SUMMARY OF THE INVENTION

An object of this invention is to provide an impulsive noise cancelling method which effectively cancels impulsive noise caused when a ratio C/N or S/N is degraded in the SSB-FM communication system or the digital communication system.

Briefly stated, in this invention applied to a system of transmitting a band-limited baseband signal through a channel having a wider band than that of the baseband signal, an impulsive noise caused in the transmission channel is detected, to produce a detected output, from the received signal of the transmission channel outside of the frequency band of the band-limited baseband signal, and a cancelling pulse of reverse-polarity is derived as a pseudo noise pulse from the detected output and then superimposed on the original received signal, thereby cancelling the impulsive noise.

BRIEF DESCRIPTION OF THE DRAWINGS

The principle, construction and operation of this invention will be clearly understood from the following detailed description taken in conjunction with the accompanying drawings, in which.

DESCRIPTION OF THE PREFERRED EMBODIMENTS

Figure 1:
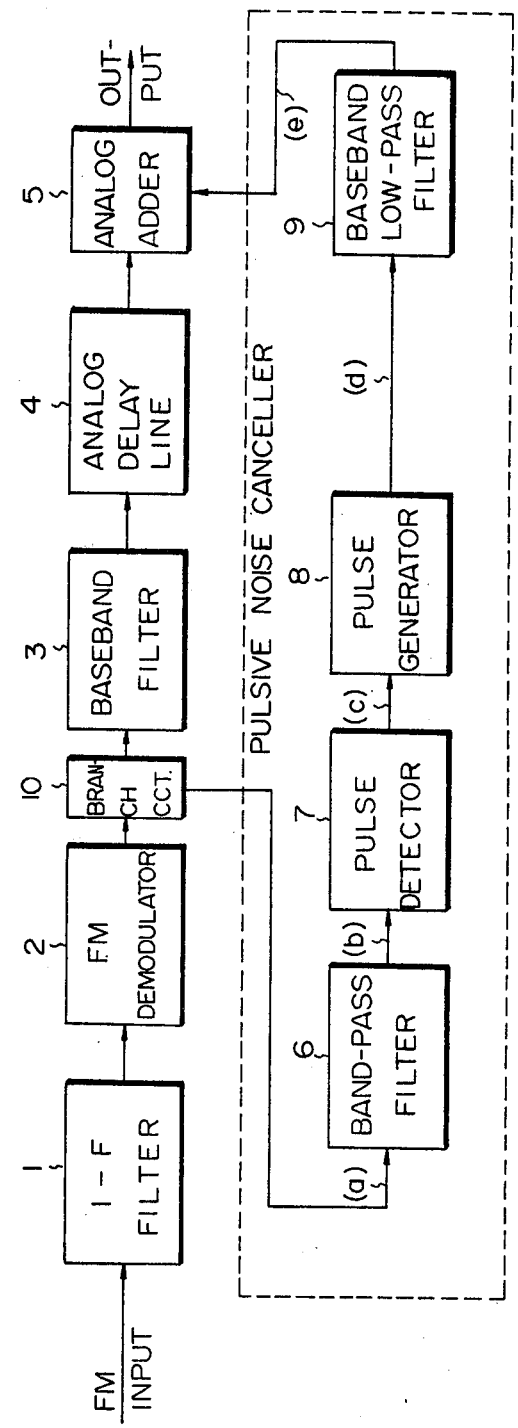
FIGS. 1, 3 and 4 are block diagrams each illustrating an embodiment of this invention.

With reference to FIG. 1, an example of this invention as being applied to an FM receiver will be described. In FIG. 1, reference numeral 1 indicates an intermediate-frequency filter for deriving an FM signal from an FM input; 2 designates an FM demodulator; 3 identifies a baseband filter for extracting only the signal band after demodulation; 4 denotes an analog delay line; 5 represents an analog adder; 6 shows a band-pass filter for extracting an output noise of the baseband signal from the FM modulator output; 7 refers to a pulse detector; 8 indicates a pulse generator for generating pulses with the reverse polarity actuated by the output from the pulse detector 7; 9 designates a baseband low-pass filter which equivalently produces from the output of the pulse generator 8 an impulsive noise present in the output of the baseband filter 3, that is, in a baseband signal; and 10 identifies a demodulation signal branch circuit.

Next, the operation of this invention will be described in connection with the circuit depicted in FIG. 1. An FM signal having passed through the intermediate-frequency filter 1 is demodulated by the demodulator 2 to a baseband signal.

The transmission band width $F_w$ for an FM signal depends upon the highest frequency $f_b$ of the baseband signal and the highest frequency deviation $\Delta f_{max}$ of the signal and is usually determined as follows:

$$F_w = 2(f_b + \Delta f_{max})$$

That is, a transmission line $F_w$ whose band is wider than the signal band $f_b$ of the baseband is required.

Figure 2:
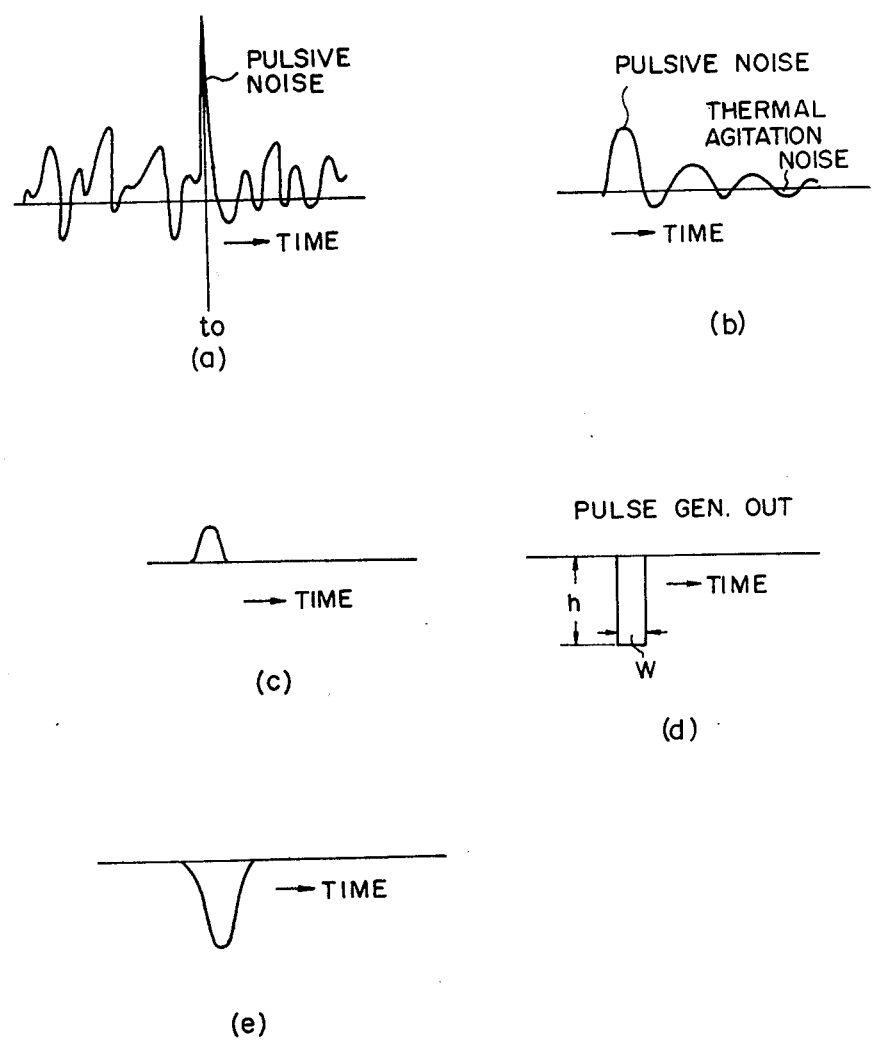
FIG. 2 shows waveform diagrams explanatory of the operation of the embodiment shown in FIG. 1.

As is evident from the above equation, in FM transmission, a signal is received in a band wider than the baseband, and thereafter the baseband signal is selected by a filter. That is, in the FM communication system, the signal transmission band width of the channel is always larger than the signal band width so as to obtain a wide-band gain peculiar to the FM system. As a consequence, the output from the FM demodulator 2 always includes the baseband components of the signal and thermal agitation noises of higher frequency components. The signal component of the output from the FM demodulator 2 is applied via the branch circuit 10 and the baseband bandpass filter 3 to the analog delay line 4. At the same time, the output from the FM demodulator 2 is applied via the branch circuit 10 to the bandpass filter 6, in which only the thermal agitation noise components are extracted. Since the peak of the noise voltage exceeds the peak of the signal voltage owing to the deterioration of the ratio C/N in the input signal, a large impulsive noise peculiar to the FM system is generated. The rise time of the impulsive noise is naturally dependent on the band width of the demodulator 2, and its spectrum is distributed substantially uniformly in the band width after demodulation. As a result of this, only high-frequency components of the spectrum of the impulsive noise are derived at the output of the band-pass filter 6. FIG. 2 shows this state on the time axis. At a moment $t_0$, a pulse is generated, which is then extracted by the band-pass filter 6 as shown in FIG. 2(b). That is, the waveform in FIG. 2(b) shows the response of the band-pass filter 6 to an input impulsive noise. The pulse shown in FIG. 2(b) is detected by the pulse detector 7 (FIG. 2(c)). However, since the thermal agitation noise increases in the output from the band-pass filter 6 with the lowering of the ratio C/N, the pulse detector 7 has incorporated therein a threshold circuit for preventing it from being actuated by the thermal agitation noise. That is, the pulse detector 7 does not respond to a steady noise such as an ordinary thermal agitation noise but responds only to an impulsive noise having a high instantaneous amplitude. The detected pulse (FIG. 2(c)) having an amplitude proportional to the peak value of the input noise and the same polarity as that of the input noise is applied to the pulse generator 8. The pulse generator 8 generates a reverse-polarity rectangular pulse (FIG. 2(d)) whose amplitude is proportional to the input level of the pulse detector 7. The pulse width W of the rectangular pulse is dependant on the base-band bandwidth and so determined as to be optimum for producing the reverse-characteristic pulse as a pseudo noise pulse. This will be described in detail later on. The pulse generator output is applied to the baseband band-pass filter 9, in which there is produced a cancelling impulsive noise (FIG. 2(e)) which is exactly reverse in amplitude to the impulsive noise component included in the output from the baseband band-pass filter 3. Further, this output is applied to the adder 5, in which it is superimposed to the demodulated signal output from the analog delay line 4. The analog delay line 4 is provided for delaying the output signal from the baseband band-pass filter 3 for a period of time in which the impulsive noise from branch circuit 10 is provided via the band-pass filter to the baseband band-pass filter 9 and derived therefrom as the cancelling impulsive noise of reverse characteristic, so that, in the adder 5, the impulsive noise in the signal is cancelled by the cancelling impulsive noise of reverse characteristic from the baseband band-pass filter 9. The analog delay line 4 may easily be achieved by the use of CCD (Charge Coupled Device), BBD (Backet Brigade Device) or the like.

As described above, the method of this invention permits of easy cancellation of an impulsive noise of large amplitude included in the input signal and hence provides for markedly improved signal quality in an FM demodulator or the like which operates at a level below a threshold level.

Next, this invention will be described as being applied to a digital signal. The digital signal herein mentioned is one that an original analog signal is sampled at discrete sample points (a PAM signal) or one that the sampled signal is further subjected to coding processing such as PCM (which signal will hereinafter be referred to as the digital code). The digital signal has thus such information which is discrete in time, so that if an error is produced by the influence of noise or the like during transmission, the error affects only one sample value. That is, the error results in an impulsive noise. In this manner, all the errors in the digital signal become impulsive noises, but they can be cancelled by the present invention, so that this invention has a function of an error correcting circuit for the digital signal.

Figure 3:
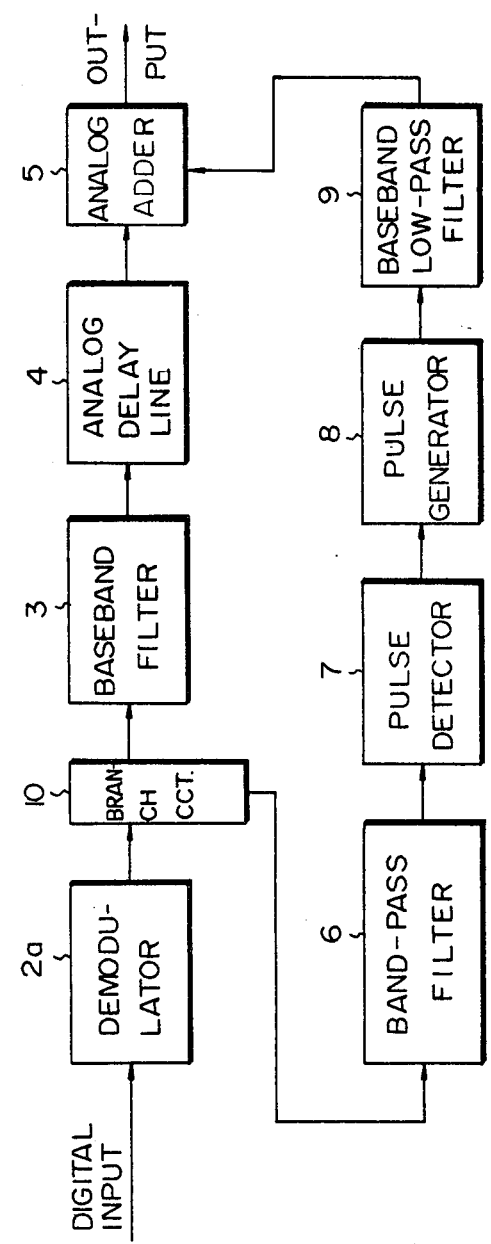

FIG. 3 illustrates an embodiment of this invention as being applied to the digital signal. Reference numeral 2a indicates a demodulator for demodulating an input signal; 3 through 5 designate the same circuits as those 3 to 5 in FIG. 1; 6 identifies a band-pass filter for picking up a noise output outside of the signal baseband from the demodulated output of the demodulator 2a; and 7 through 10 denote the same circuits as those 7 to 10 in FIG. 1.

Next, the operation of this embodiment will be described. The input signal is one that the aforesaid digital signal is transmitted in the baseband or transmitted after being subjected to modulation such as PSK (Phase Shift Keying) modulation. This input signal is demodulated by the demodulator 2a to a PAM (Pulse Amplitude Modulation) signal or an analog signal. The following description will be given on the assumption that the input signal is converted to the PAM signal. Generally, in case of sampling an analog signal, the sampling frequency $W_s$ is more than twice as high as the band $W_f$ of the original signal on the sampling theory. If $W_r = W_s - 2W_f$, $W_r$ usually account for about 10 to 20% of the bandwidth $W_f$, and no signal is transmitted in the bandwidth $W_r$. Accordingly, if no error is produced by noise in the transmission line, no spectrum exists in the bandwidth $W_r$. When PCM coding or the like is achieved, a noise spectrum based on a quantizing noise is yielded, but the power of the noise spectrum is sufficiently smaller than the signal power. In a case where an error has been produced by a noise or the like in the demodulated output, an error pulse of the same amplitude as the error pulse in the PCM coding is equivalently added to a sampled pulse train of the original signal, and as a consequence, a noise spectrum proportional to the magnitude of the error pulse appears at the output of the demodulator 2a. The noise spectrum appears not only in the signal band $W_f$ but also in the entire region of the band $W_s$, and the magnitude of amplitude spectrum is in proportion to the magnitude of the error pulse. As a result of this, the bandpass filter 6 produces an output proportional to the bandwidth of the filter and the amplitude and polarity of the error pulse. Thus, as is the case with FIG. 1, the error pulse can be cancelled.

Figure 4:
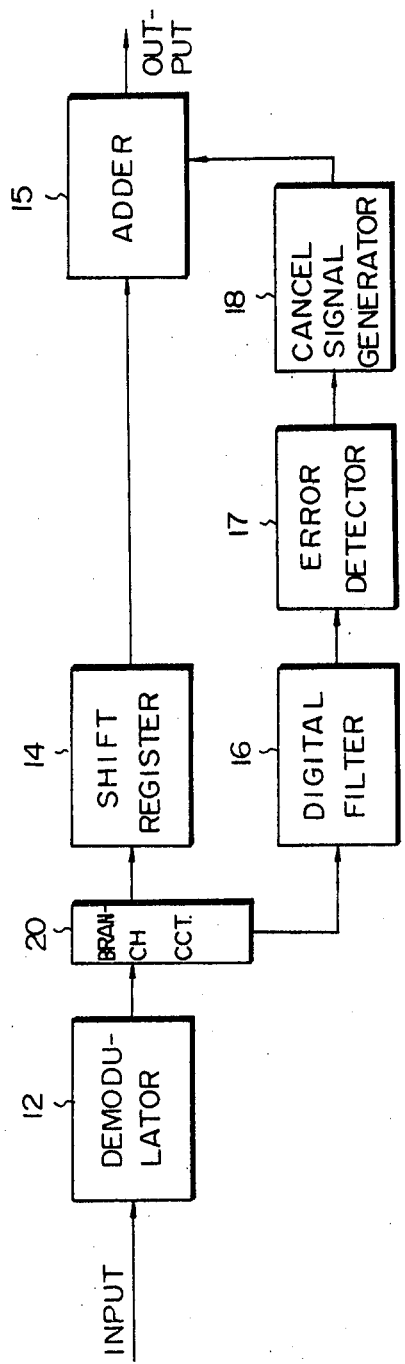

FIG. 4 shows another embodiment of this invention as being similarly applied to the digital signal, in which an error is cancelled by only digital signal processing. The input signal is the same as in the case of FIG. 3. Reference numeral 12 indicates an input signal demodulator, whose output is provided in the form of a digital code; 20 designates a branch circuit for the output from the demodulator 12; 14 identifies a shift register for delaying the digital code derived from the branch circuit 20; 16 denotes a digital filter for extracting the out-of-band spectrum resulting from an error; 17 represents an error detector for detecting the presence or absence and the amplitude and polarity of an error pulse from the output of the digital filter 16; 18 shows a cancel signal generator for producing a signal which is equal in amplitude but reverse in polarity to the error pulse detected by the error detector 17; and 15 refers to an adder for adding together the outputs from the shift register 14 and the cancel signal generator 18.

Next, the operation of this embodiment will be described. The digital code derived from the demodulator 12 is assumed to be a binary number because it is convenient for calculation, but any other codes may also be used. In a case where the demodulator output includes an error, a noise spectrum is also yielded outside of the original analog signal and its magnitude is proportional to the magnitude of the error pulse, as described previously in respect of FIG. 3. Accordingly, if the output signal of the demodulator 12 is applied to the digital filter 16 to extract the spectrum outside of the signal band, the amplitude and polarity of the filter output signal are in proportion to those of the error pulse and the bandwidth of the digital filter. If a proportional constant between the magnitude of the error pulse and the magnitude of the output from the digital filter 16 is preset in the error detector 17, the presence or absence of the error pulse and, if it exists, its magnitude can be detected by applying the output of the digital filter 16 to the error detector 17. The value of the proportional constant can be easily set experimentally by comparing the error pulse in magnitude with the output of the digital filter 16. Upon detection of the error pulse, the cancel signal generator 18 is driven to provide a code which is equal in absolute value but reverse in polarity to the error pulse and the code is applied to the adder 15 for addition to the output of the shift register 14. The shift register 14 has a function of delaying a signal so that two outputs from the branch circuit 20 are coincident with each other in the adder 15. In this embodiment, since the input signal is the digital signal, if an error is produced in the digital signal, the magnitude of the error also assumes a digital form. Accordingly, by properly detecting the magnitude of the error in digital quantity by the circuit 16 and 17, it is possible to completely cancel the error pulse by means of the circuits 18 and 15. Further, by applying the output of the adder 15 to a digital-to-analog converter and a band-pass filter, the original analog signal with no error is reproduced.

Figure 5:
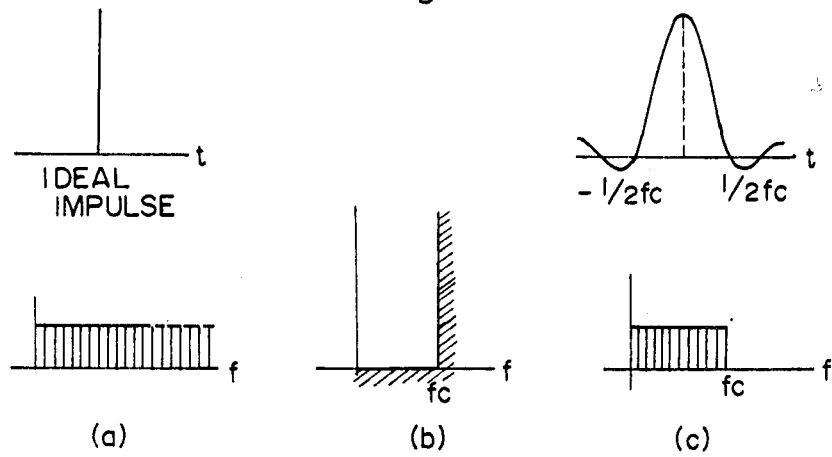
FIGS. 5 and 6 show waveform diagrams and spectrum distribution diagrams explanatory of the principle for producing a pseudo noise pulse used in this invention.
Figure 6:
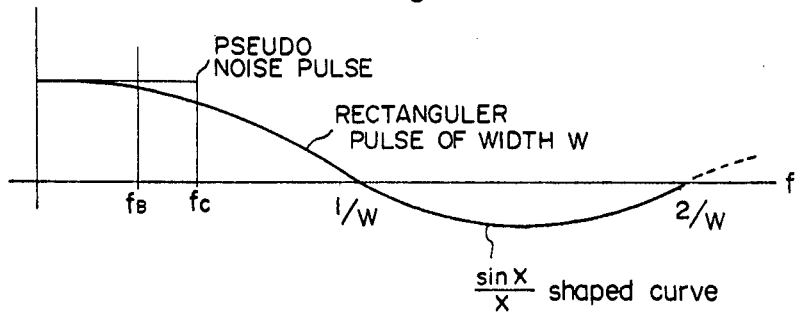

A description will be made with respect to the determination of the pulse width W mentioned previously. Now, let $f_c$ represent the highest frequency of the demodulated output from the FM demodulator 2 and $f_b$ represent the highest frequency of the output from the baseband band-pass filter 3 ($f_b < f_c$). The noise pulse in the output from the FM demodulator 2 is, in practice, not an ideal impulse but a pulse of a limited width. The configuration of the pulse depends on the FM demodulator 2 and the band-pass characteristic of the part preceding thereto. Then, the configuration of the noise pulse in the output from the FM demodulator 2 is approximated with a response pulse (c) of an ideal impulse (a) for an ideal low-pass filter (b) having a cutoff frequency $f_c$, as shown in FIG. 5. Further, since the pulse generator 8 shown in FIG. 1 cannot produce the ideal impulse, let it be assumed that the pulse generator provides a rectangular, reverse-polarity pseudo noise pulse of the width W. A comparison of the spectrum distributions of the pseudo noise pulse (c) shown in FIG. 5 and the rectangular pulse of the width W is illustrated in FIG. 6. As is seen from FIG. 6, the larger 1/W is, that is, the smaller the pulse width is, the closer to the pseudo noise pulse the spectrum distribution of the pseudo noise pulse becomes. In practical use, it is sufficient only to consider a baseband signal of a frequency below $f_b$ ($<f_c$) and to select 1/W to be several times the frequency $f_c$. The pulse width can be determined in this manner.

Figure 7:
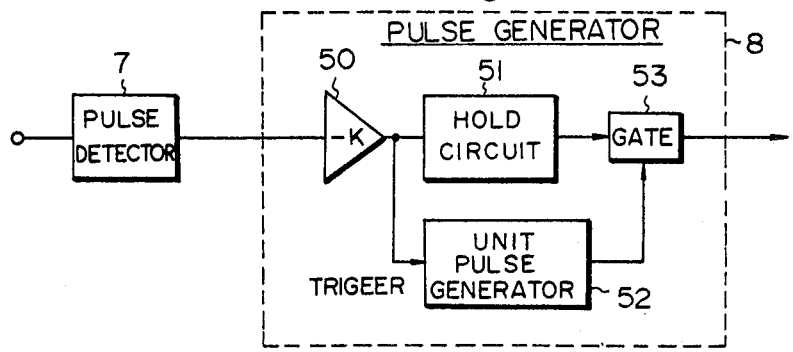
FIG. 7 is a block diagram illustrating an example of a pulse generator for use in this invention.

The height h of the reverse-polarity pseudo noise pulse (refer to FIG. 2(d)) produced by the pulse generator depicted in FIG. 1 is determined in the following way. In FIG. 7, the output from the pulse detector (7 in FIG. 1) is applied to a polarity inverting amplifier 50 having a predetermined gain, and the peak value of the amplified output is held by a hold circuit 51. The gain of the amplifier is selected such that the peak hold value becomes the height of the pseudo noise pulse desired to obtain. In other words, the gain corresponds to the proportional constant between the peak value of the output signal from the pulse detector 7 and the height of the pseudo noise pulse, and this value is determined to meet the condition that the frequency spectra in FIG. 6 are equal in height to each other. In concrete terms, the purpose can be served by calculating the proportional constant in advance from data such as the peak values of impulse responses of the low-pass filter and the out-of-baseband band-pass filter used and the spectrum distribution of the rectangular pulse. Simultaneously with the peak value hold operation, in a unit pulse generator 52, a unit pulse of the width W determined as described above is produced when the unit pulse generator is triggered by the output signal of the pulse detector 7. By gating the peak hold value by the unit pulse in a gate circuit 53, a reverse-polarity pseudo noise pulse of desired width and height is yielded at the output of the pulse generator 8.

This invention is effective in case where the occurence frequency of impulses is not so high and impulses can be distinguished from adjacent ones of them at the input of the pulse detector.

As has been described in the foregoing, according to this invention, an impulsive noise is detected by using a received output outside of the baseband of a received signal and an impulsive noise opposite in polarity to the detected impulsive noise is produced and then added to a required received signal, thereby improving the received signal quality. Although this invention has been described as being applied to an FM signal (PM signal) and a digital signal, the invention is applicable to all of such transmission systems in which an impulsive noise in the received signal can be detected outside of the receiving band. This invention can be easily applied, for example, to an amplitude phase modulation system and the like and produces a great effect.

What we claim is:

1. A method for cancelling impulsive noise for a system of transmitting a band-limited baseband signal using a transmission channel having a transmission bandwidth larger than the bandwidth of the baseband signal, comprising the steps of: applying an out-band signal received outside of the frequency band of the baseband signal in a received signal to an impulse detector having a predetermined threshold level to detect the peak of an impulsive noise in the received out-band signal and to produce a detected impulsive noise output; generating a rectangular pulse having a duration determined according to the transmission bandwidth of the band-limited baseband signal and having a peak level determined according to the detected peak of the impulse noise; producing a pseudo noise pulse substantially equal in level but reverse in polarity to the impulsive noise from the detected impulsive noise output by passing said rectangular pulse through a baseband low-pass filter; and adding the pseudo noise pulse to the baseband signal, thereby to cancel the impulsive noise from the received signal.

2. A method according to claim 1, wherein the outband received signal is picked up by a branch circuit from an analog output from an analog demodulator for demodulating the received signal, wherein the pseudo noise pulse is produced as an analog noise wave, and wherein the baseband signal obtained in the analog output from the demodulator is added to the analog noise wave via an analog delay line having a delay time corresponding to the time necessary for producing the analog noise wave.

3. A method according to claim 1, wherein the outband received signal is picked up by a branch circuit from a digital output from a digital demodulator for demodulating the received signal, wherein the pseudo noise pulse is produced as a digital noise wave, and wherein the baseband signal obtained in the digital output from the demodulator is added to the digital noise wave via a shift register having a delay time corresponding to the time necessary for producing the digital noise wave.

* * * * *